US012778112B2

(12) United States Patent
Folmar

(10) Patent No.: US 12,778,112 B2
(45) Date of Patent: Nov. 3, 2026

(54) GAME CALL HAVING AIR DIRECTING RELIEF

(71) Applicant: Jonathan Russel Folmar, Cedarburg, WI (US)

(72) Inventor: Jonathan Russel Folmar, Cedarburg, WI (US)

( * ) Notice: Subject to any disclaimer, the term of this patent is extended or adjusted under 35 U.S.C. 154(b) by 224 days.

(21) Appl. No.: 18/680,152

(22) Filed: May 31, 2024

(65) Prior Publication Data

US 2025/0366464 A1 Dec. 4, 2025

(51) Int. Cl.
*A01M 31/00* (2006.01)

(52) U.S. Cl.
CPC ................................ *A01M 31/004* (2013.01)

(58) Field of Classification Search
CPC .................................................. A01M 31/004
See application file for complete search history.

(56) References Cited

U.S. PATENT DOCUMENTS

| | | | | |
|---|---|---|---|---|
| 1,367,176 | A | 2/1921 | Bridges | |
| 3,738,056 | A | 6/1973 | Schultz | |
| 4,218,845 | A | 8/1980 | Allen | |
| 4,341,037 | A | 7/1982 | Moss | |
| 4,483,097 | A | 11/1984 | Piper | |
| 4,614,503 | A | 9/1986 | Skoda | |
| 4,897,067 | A | 1/1990 | Piper | |
| 4,927,399 | A | 5/1990 | Mueller | |
| 4,960,400 | A | 10/1990 | Cooper | |
| 5,234,369 | A | 8/1993 | Forbes | |
| 5,415,578 | A * | 5/1995 | Jacobsen | A01M 31/06 446/397 |
| 5,785,574 | A | 7/1998 | Sears | |
| 6,953,378 | B1 | 10/2005 | Finley, Jr. | |
| 8,016,638 | B1 | 9/2011 | Kirby | |
| 10,172,344 | B1 | 1/2019 | Carlton | |
| 10,448,629 | B2 | 10/2019 | Koch | |
| 2004/0209543 | A1 | 10/2004 | Davis | |
| 2010/0279581 | A1 | 11/2010 | Borhofen | |
| 2017/0188568 | A1 | 7/2017 | Vaicunas | |
| 2021/0076665 | A1 | 3/2021 | Jordan | |
| 2021/0345598 | A1 | 11/2021 | Folmar | |

* cited by examiner

*Primary Examiner* — Audrey B. Walter
(74) *Attorney, Agent, or Firm* — Andrus Intellectual Property Law, LLP

(57) ABSTRACT

A game call includes a holder molded from an elastomeric material that is configured to retain to a resting shape. A body portion of the holder includes a slot formed in an inward-facing surface of the body that extends around a cutout positioned at a front side of the body. The slot formed in the body portion is designed to receive and retain a reed insert that includes a diaphragm configured to extend across the cutout when the reed insert is received in the holder. The holder is designed with a generally planar bottom surface that directs the air flow from the user to the diaphragm. A relief is formed on the holder that extends away from the bottom surface. The protruding relief interrupts the otherwise laminar air flow to create areas of turbulent air flow, The areas of turbulent air flow modify the sound generated by the game call.

16 Claims, 6 Drawing Sheets

GAME CALL HAVING AIR DIRECTING RELIEF

BACKGROUND

The present disclosure generally relates to a game call, and in particular to a game call intended to be held in a user's mouth. More specifically, the present disclosure is directed to a game call that has a relief formed on the bottom surface of the molded holder to modify the airflow over the bottom surface and the diaphragm supported by a reed insert positioned in the molded holder.

Many different types of game calls are used to produce sounds to attract game animals. One type of game call comprises a flexible diaphragm stretched across an open-ended frame. The call is placed against the roof of the user's mouth and then various techniques may be used to produce appropriate sounds by forcing air across the diaphragm.

In many past game call designs, a diaphragm is stretched across a metal frame to form a reed insert. The reed insert is then sandwiched between two layers of tape. In such game call, the metal frame and diaphragm are equally spaced between the top and bottom layers of tape. Since tape is used on the top and bottom of the frame, the bottom surface of the game call is smooth and does not include any elements that modify the airflow over the bottom surface.

US Patent Application Publication No. 2021/0345598 is directed to a game call that replaces the two layers of tape with a holder that is formed from an elastomeric material that is designed to receive and retain a reed insert. In the design shown, the holder includes a body portion and an integrally formed outer skirt that is joined to the body portion. The bottom surface of the holder is generally smooth and does not include any relief or other protrusion that would affect the flow of air over the bottom surface. In such a game call, only the configuration of the diaphragm will modify the sound made by the game call. Thus, the user must be creative and skilled with the positioning of the game call and the tongue to create desired sounds using the game call.

The inventor has recognized that by including some type of molded relief on the bottom surface of the game call, the game call itself can create a modified sound without requiring the user to manipulate the game call in the mouth. Such improvement to the game call holder increases and changes the number of sounds that can be generated by a user.

SUMMARY

The present disclosure relates to a game call with a flexible holder configured to hold a sound-generating reed insert. The holder can be formed from materials that are safe for inclusion in a user's mouth, and which are sufficiently durable so that the game call can be used repeatedly without the holder being damaged.

The holder of an exemplary embodiment of the present disclosure is formed as a one-piece member that is designed to receive and retain a reed insert that includes a diaphragm supported by an outer frame. The holder includes a main body portion that is molded from elastomeric material and is safe for use in the mouth of a user. The body portion has a thickness that is defined between a top surface formed on a top wall and a bottom surface on a bottom wall. A U-shaped cutout is formed at the center of the main body portion and is defined by an inward-facing surface.

The holder further includes a skirt that is joined to the body portion and extends away from the body portion in a direction away from the cutout formed in the body portion. The skirt is designed to be received against the upper palate of the user's mouth and directs air flow from the user toward the diaphragm.

The holder includes a generally planar bottom surface that extends from the back to the front of the holder. The generally planar bottom surface is formed from mating bottom surfaces on the skirt and the body portion.

The holder further includes a relief that is formed along the bottom surface and extends away from the bottom surface. The relief is positioned such that the relief interrupts the flow of air along the otherwise planar bottom surface. In the areas of the bottom surface that do not include the relief, the air flow along the bottom surface is generally laminar and in the areas at or downstream from the relief, the air flow is turbulent or has a different speed as a result of passing over the relief.

In contemplated embodiments, the relief is located along the bottom surface of the body portion near the cutout. However, other locations are contemplated depending upon the desired sound to be generated by the game call.

In another contemplated embodiment, a game call is provided that includes a holder formed from materials that are safe for inclusion in a user's mouth, and which are sufficiently durable so that the game call can be used repeatedly without the holder being damaged.

The holder of an exemplary embodiment of the present disclosure is formed as a one-piece member that is designed to receive and retain a reed insert that includes a diaphragm supported by an outer frame. The holder includes a main body portion that is molded from elastomeric material and is safe for use in the mouth of a user. The body portion has a thickness that is defined between a top surface formed on a top wall and a bottom surface on a bottom wall. A U-shaped cutout is formed at the center of the main body portion and is defined by an inward-facing surface.

The holder further includes a skirt that is joined to the body portion and extends away from the body portion in a direction away from the cutout formed in the body portion. The skirt is designed to be received against the upper palate of the user's mouth and directs air flow from the user toward the diaphragm.

The holder includes a generally planar bottom surface that extends from the back to the front of the holder. The generally planar bottom surface is formed from mating bottom surfaces on the skirt and the body portion.

The holder further includes a relief that is formed along the bottom surface and extends away from the bottom surface. The relief is positioned such that the relief interrupts the flow of air along the otherwise planar bottom surface. In the areas of the bottom surface that do not include the relief, the air flow along the bottom surface is generally laminar and in the areas at or downstream from the relief, the air flow is turbulent or has a different speed as a result of passing over the relief.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise specified or limited, the term "U-shaped" specifies a shape that includes a base portion, with at least two leg portions extending in generally similar (e.g., parallel) directions from the base portion. In some embodiments, a "U-shaped" structure can include leg portions extending from opposite ends of the base portion at substantially right angles to the base portion, with or without curved or chamfered connecting regions between the leg portions and the base portion. In some embodiments, a "U-shaped" structure can include at least one of legs of different lengths and at least one curved portion.

Embodiments of the disclosure may be further understood in reference to the figures.

Figure 1:
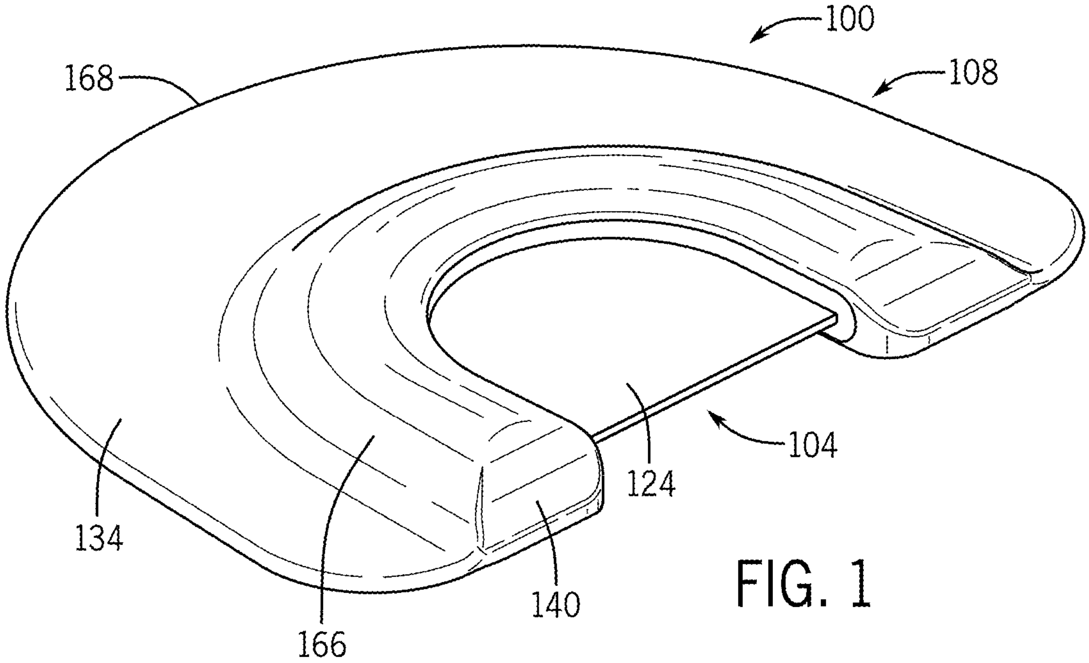
FIG. 1 is a perspective view of an embodiment of a game call including a flexible holder and a reed insert.
Figure 2:
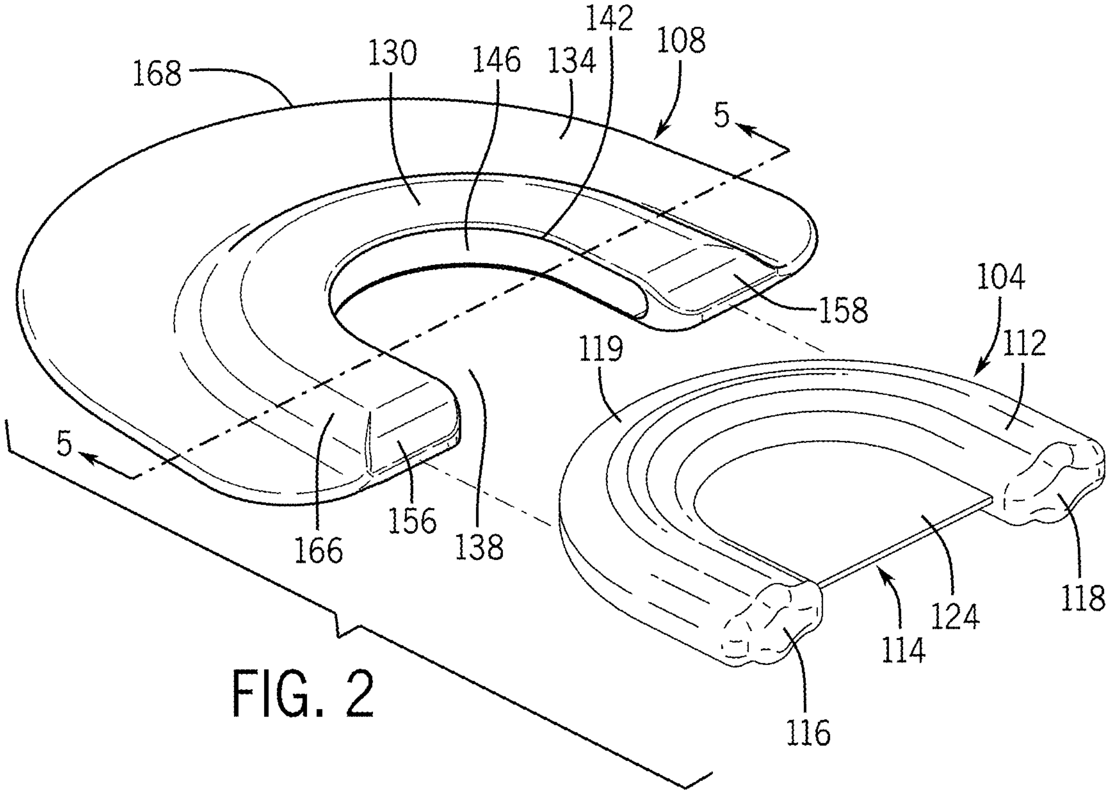
FIG. 2 is an exploded perspective view of the flexible holder and reed insert of FIG. 1.

FIGS. 1 and 2 illustrate an embodiment of a game call 100 with a reed insert 104 configured to be secured in a holder 108. The reed insert 104 includes a frame 112 that is generally U-shaped and has an open front side 114. The frame 112 extends rearward from a first end 116 and a second end 118, which are spaced laterally apart from each other at the front side 114 of the frame, towards a back end 119 that is positioned between the first and second ends 116, 118. A diaphragm 124 can be stretched across the frame 112 so that the diaphragm 124 extends across a gap between opposite sides of the frame 112. In some embodiments, the diaphragm 124 may provide a single planar sheet of flexible material, such as rubber, that spans (i.e., covers or fills in) the gap. In other embodiments, the diaphragm 124 can include multiple layers of flexible rubber material designed to create the desired sound to simulate the game being called.

In some embodiments, the frame 112 can include a pair of U-shaped planar halves, each being mateable with a corresponding plane of the other. The halves of the frame 112 can be secured to each other to sandwich a diaphragm 124 between the halves, thereby securing the diaphragm to the frame 112. The two halves of the frame 112 may be linked at their front ends so that the halves of the frame 112 are folded onto the diaphragm 124. Additionally, a tab positioned at the rear of one of the halves may be folded onto the other half of the frame 112, securing the two halves together. In other embodiments, however, a game call can include a reed insert that includes different components or is produced using a different method.

With continued reference to FIGS. 1 and 2, the holder 108 can include a reed receiving body portion 130, which may be configured to receive the reed insert 104, and a skirt 134 formed around a portion of the reed receiving body portion 130. The reed receiving body portion 130 and the skirt 134 can be formed from a unitary molded elastomeric material that is configured to return to its original resting shape after being stretched or deformed. This may be useful, for example, to allow the holder 108 to retain its original shape after being stretched and manipulated by a user. In some embodiments, the holder 108 may be formed with a thermoset material, such as a plastisol or rubber elastomer. Other embodiments of a holder 108 may be formed with at least one of another thermoset elastomer, a thermoplastic, rubber, silicone, and any other material exhibiting elastic or resilient properties. It is contemplated that the material used to form the holder 108 will be selected such that the material is suitable for use in the oral cavity of the user. In a contemplated embodiment, the material used to form the holder will be formally approved for use in the oral cavity by the Food and Drug Administration (FDA).

In the illustrated embodiment, a cutout 138 positioned at the front side 140 of the body 130 extends backwards towards an inward-facing surface 142 of the body portion 130, providing an open end on the front side 140. The inward-facing surface 142 wraps around the cutout 138 between endpoints that are positioned at the front side 140 on opposite lateral sides of the cutout 138. To accommodate the reed insert 104, the holder 108 can include an open slot 146 formed into the inward-facing surface 142. As illustrated in the section view of FIG. 4, the slot 146 extends into the body portion 130 from an opening on the inward-facing surface 142 towards a rear wall 150 of the slot 146. The top and bottom extents of the slot 146 are respectively bound by a top wall 152 and a bottom wall 154 formed on opposite vertical sides of the rear wall 150. As shown in FIGS. 1 and 2, the ends of the slot 146 are bound by a first front wall 156 and a second front wall 158, which are positioned on opposite lateral sides of the cutout 138.

As previously mentioned, the body portion 130 of the holder 108 can be configured to receive the reed insert 104. As illustrated in FIG. 2, for example, slot 146 extends around the cutout 138 in a U-shaped path with dimensions that correspond to the dimensions of the frame 112 of the reed insert 104. The body portion 130 can be dimensioned so that the diaphragm 124 extends out of slot 146 and provides a continuous sheet spanning across the cutout 138 while the reed insert 104 is in the holder 108. While the frame 112 is received in the slot 146, the first end 116 of the frame 112 is positioned behind the first front wall 156 of the body 130, and the second end 118 of the frame 112 is positioned behind the second front wall 158 of the body 130. Abutment between the ends 116, 118 of the frame and the first and second front walls 156, 158 may restrict sliding movement of the reed insert 104 relative to the holder 108. This may be useful, for example, in order to prevent the reed insert 104 from sliding out of the holder 108. Additionally or alternatively, the body 130 can be configured to grip the frame 112 to apply a retention force against the removal of the reed insert 104 from the holder 108.

In a contemplated exemplary embodiment, an adhesive is positioned between the frame 112 of the reed insert 104 and the inner surfaces of the elastomeric material that forms the open slot 136. The adhesive is selected to create the required bond between the metallic frame 112 and the elastomeric material of the holder 108. In yet another contemplated embodiment, the metallic frame 112 could be ultrasonically welded to the material of the holder 108. The bonding between the reed insert is designed to prevent separation of the component and to restrict the entry of moisture into the open slot 146 during use of the game call 100 in the mouth of the user.

The open slot 146 can be dimensioned so that the at least one of top wall 152, the bottom wall 154, and the rear wall 150 snugly fit around the frame 112 to create friction between their surfaces. Some embodiments of the body portion 130 can be configured to conform to features on the surface of the frame 112.

Referring back to FIGS. 1 and 2, the skirt 134 extends from an outward-facing surface 166 of the body portion 130 to a peripheral edge 168. In the illustrated embodiments, the outward-facing surface 166 extends around the body portion 130 in a U-shaped path the mirrors the inward-facing surface 142. As shown in the cross-section of FIG. 4, the skirt 134 is integrally formed with the body portion 130 and is formed from the same material as the body portion 130. The skirt 134 is designed to be flexible and may return to a resting shape after being manipulated by a user. This may be useful, for example, so that the skirt 134 can conform to the interior of a user's mouth during use of the game call.

When used, the game call 100 is placed in the mouth of a user and held above the tongue with the cutout 138 and the front walls 156, 158 of the body 130 facing outwardly towards the user's teeth. The "top" of the game call 100 is placed into contact with the upper palate and the "bottom" of the game call 100 is positioned to contact the tongue of the user. The skirt 134 can flex to contact the upper palate snugly, which may help to keep the game call 100 lodged in place during use. When the user blows, an airstream travels along a bottom surface 172 of the holder, beneath and past the skirt 134, past the bottom surface of the body 130, then beneath and past the diaphragm 124, thereby generating an audible oscillation. Various techniques may be implemented by the user to produce a variety of different sounds with the game call 100.

Figure 3:
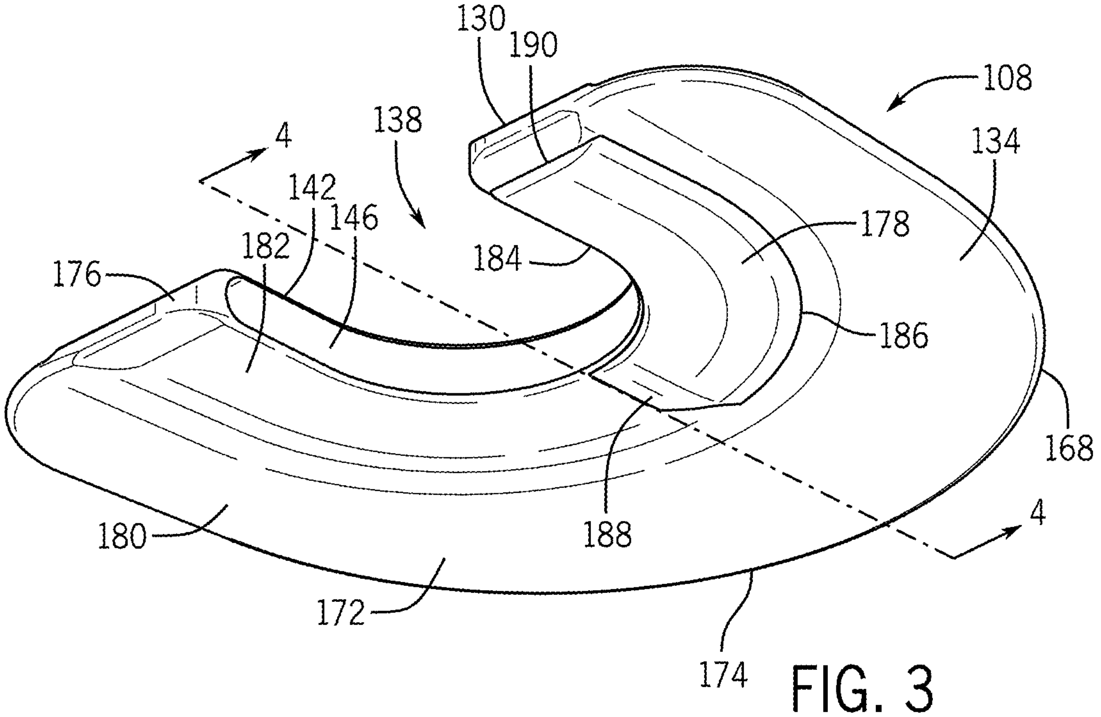
FIG. 3 is a bottom perspective view of the game call including a relief formed on the bottom surface.
Figure 4:
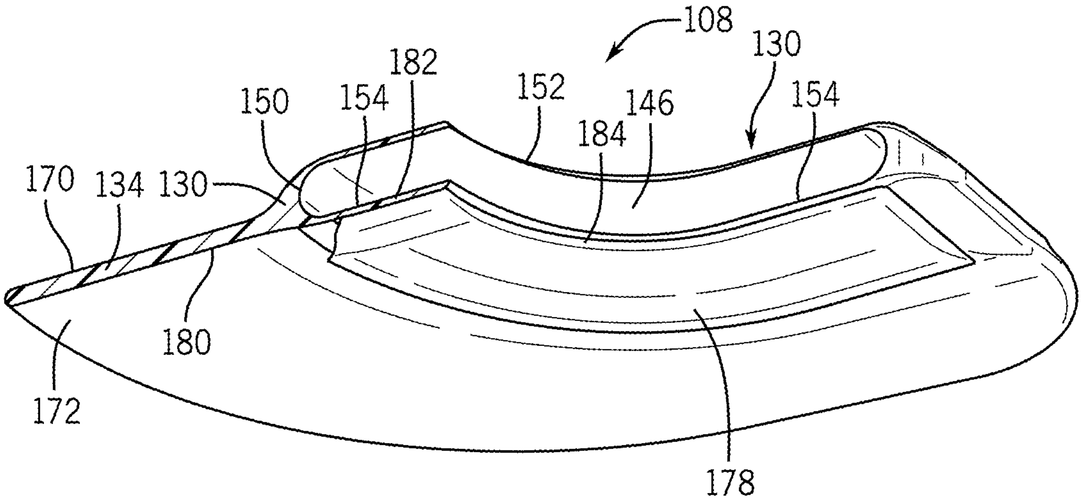
FIG. 4 is a section view taken along line 4-4 of FIG. 3 showing the relief formed on the bottom surface.

Referring now to FIGS. 3 and 4, the preferred configuration of the game call 100 of the present disclosure will be further discussed. As discussed above, the holder 108 includes an open slot 146 formed in the body portion 130. The open slot 146 is defined between a top wall 152 and a bottom wall 154.

Referring back to FIG. 3, skirt 134 extends from the peripheral edge 168 to a position where the skirt 134 joins the body portion 130. As illustrated in a sectional view of FIG. 4, the skirt 134 is a generally planar element having a top surface 170 and a bottom surface 180. The bottom surface 180 is designed to face toward the tongue of a user, while the top surface 170 is positioned in contact with the upper palate of a user's mouth. The terms top surface and bottom surface are relative to the position of the game call 100 within a user's mouth as discussed above.

As best illustrated in the section view of FIG. 4, the bottom surface 172 extends across the entire holder 108 and defines a generally planar bottom surface 172. During use of the game call including the holder 108, the flow of air created by the user travels along the generally planar bottom surface 172 from the rear end 174 to the front end 176. When the reed insert and diaphragm are inserted into the holder 108 as shown in FIG. 1, the flow of air over the bottom surface 172 contacts the diaphragm 124, causing the diaphragm 124 to vibrate and create a sound for the game call 100. As indicated previously, the diaphragm 124 could include one or more layers of flexible rubber material that vibrate upon the flow of air over the diaphragm. In some embodiments, the one or more layers of the diaphragm 124 can include cuts, removed portions and different configurations to change the different sounds made by the game call 100. Although changing the configuration of the diaphragm 124 is one method of modifying the sounds made by the game call 100, the present disclosure has been developed to include a relief 178 that is included along the bottom surface 172 to modify the flow of air along the bottom surface 172 to modify the sound created by the game call including the holder 108.

Referring back to FIG. 4, the bottom surface 172 is comprised of a bottom surface 180 formed on the skirt 134 and a bottom surface 182 that is formed as part of the bottom wall 154 formed as part of the body portion 130. In the embodiment of the holder 108 shown in FIG. 4, the bottom surface 180 of the skirt 134 and the bottom surface 182 of the body portion 130 are integrally molded with each other and define a generally planar bottom surface 172 that extends over the entire holder 108, as can be seen in FIG. 3.

Referring now to FIG. 3, the relief 178 shown in the embodiment of FIG. 3 has a thickness and protrudes away from the bottom surface 182. The relief 178 shown in FIG. 3 has an inner edge 184 that generally corresponds to the shape of the cutout 138. Thus, the inner edge 184 generally corresponds to the inward-facing surface 142. The relief 178 includes an outer edge 186 that has a shape corresponding to the inner edge 184 such that the relief 178 has a constant width from its first end 188 to the second end 190. The second end 190 in the embodiment shown terminates at the front end 176 of the holder 108. The outer surface of the relief 178 has a smooth curvature from the outer edge 186 to the inner edge 184 that will not irritate the tongue of the user but will interrupt the air flow along the bottom surface 172.

Figure 5:
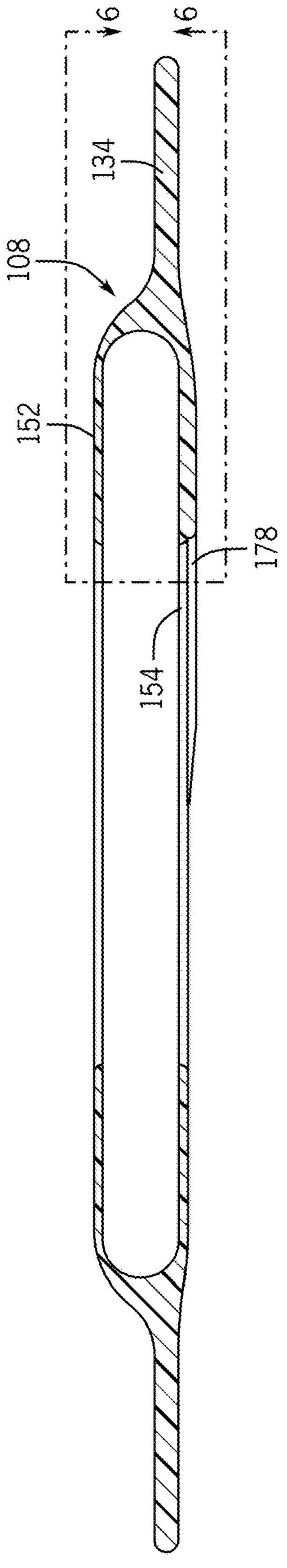
FIG. 5 is a section view taken along line 5-5 of FIG. 2 showing the expanded thickness of the relief area.
Figure 6:
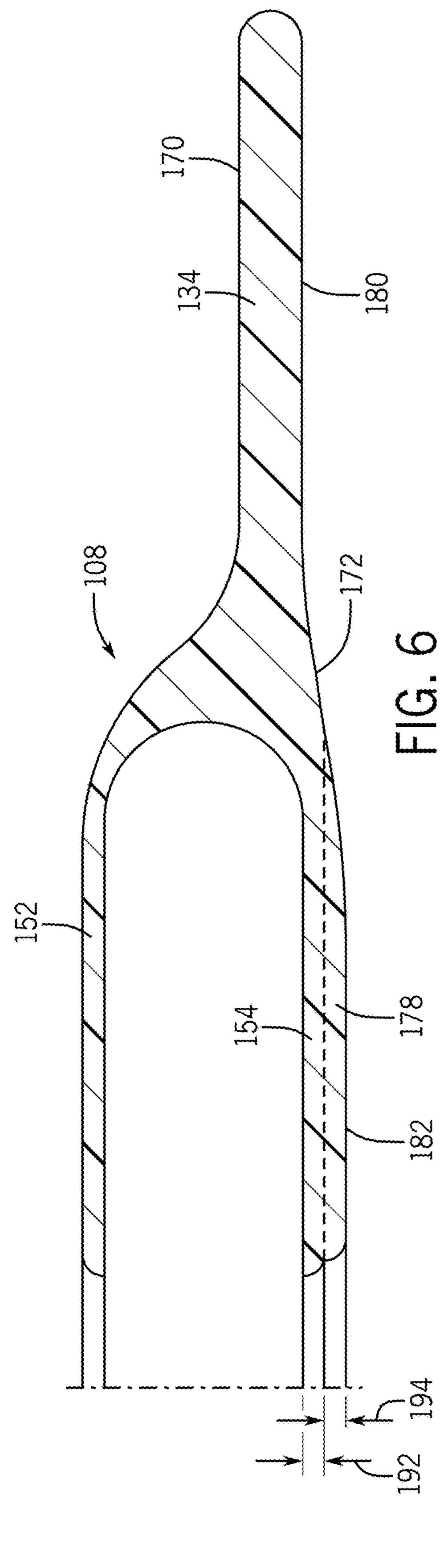
FIG. 6 is a magnified view of FIG. 5.

Referring now to FIGS. 5 and 6, the thickness of the relief 178 is more clearly shown. As described previously, the relief 178 is integrally formed with the material used to form the remainder of the holder 108. As can be most clearly seen in FIG. 6, the bottom wall 154 and the top wall 152 each have a thickness 192 that is less than the thickness of the skirt 134. The relief 178 has a thickness 194 that is equal to or greater than the thickness 192 of the bottom wall 154. As shown in FIG. 5, the remaining portions of the bottom wall 154 that extend past the relief 178 have the thickness 192. Thus, the expanded thickness of the relief 178 is located only in the area of the relief.

In the embodiment of the holder 108 shown in FIG. 6, the bottom surface 180 of the skirt 134 is generally planar with the bottom surface 182 of the body portion 130 and defines the bottom surface 172 of the entire holder 108. As shown, there can be a slight transition between the bottom surface 180 and the bottom surface 182, but the entire bottom surface 172 is designed to be generally planar to provide a smooth surface for air flow during use of the game call.

Although the relief 178 is shown in a specific location along the bottom surface 172 and having a specific shape, it should be understood that the relief 178 could be located in other locations along the bottom surface 172 and could have other shapes while operating within the scope of the present disclosure. The configuration of the relief 178 is designed to extend away from the bottom surface 172 to interrupt the flow of air created by the user when the game call 100 is inserted into the user's mouth and the user creates a flow of air that passes over the bottom surface 172.

Figure 7:
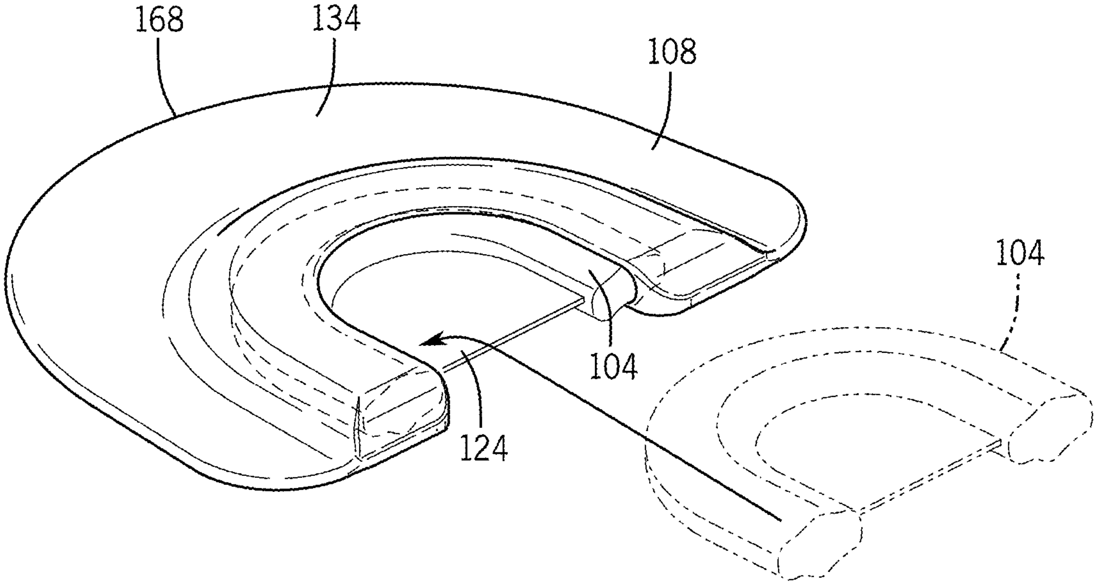
FIG. 7 is a perspective view showing the insertion of the reed insert into the holder.
Figure 8:
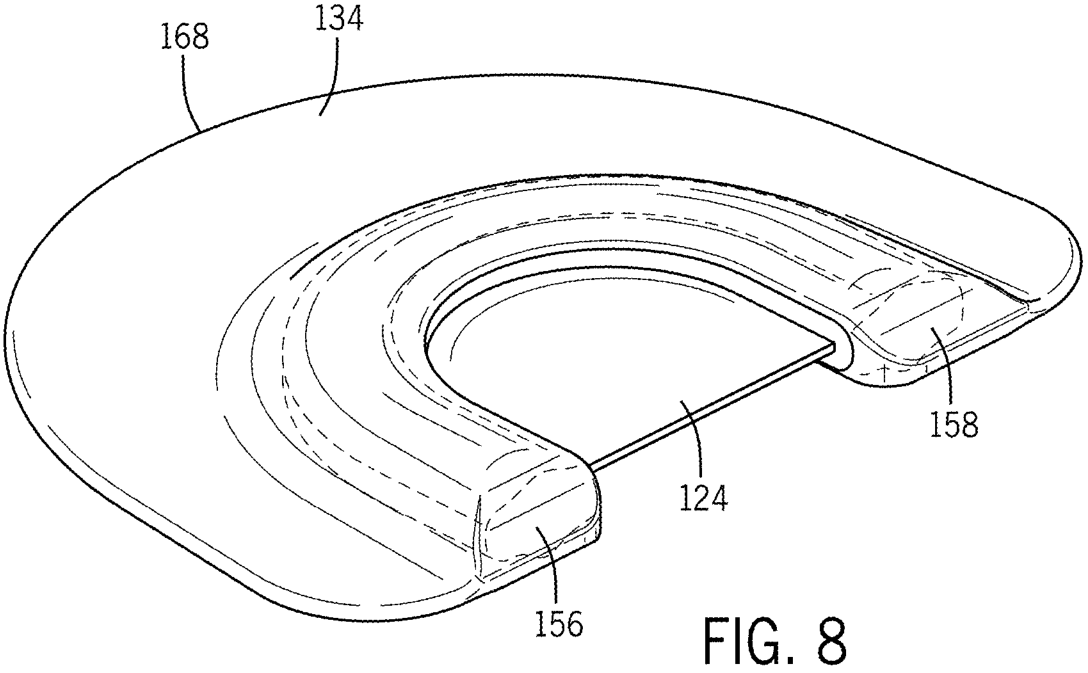
FIG. 8 is a perspective view of the assembled game call.

FIGS. 7 and 8 illustrate the insertion of the reed insert 104 into the holder 108. As indicated previously, the reed insert 104 is designed to be permanently held in the holder 108 using either an adhesive or welding such that a liquid seal is created between the reed insert 104 and the holder 108 to prevent liquid from being trapped in the open slot 146 during use.

Figure 9:
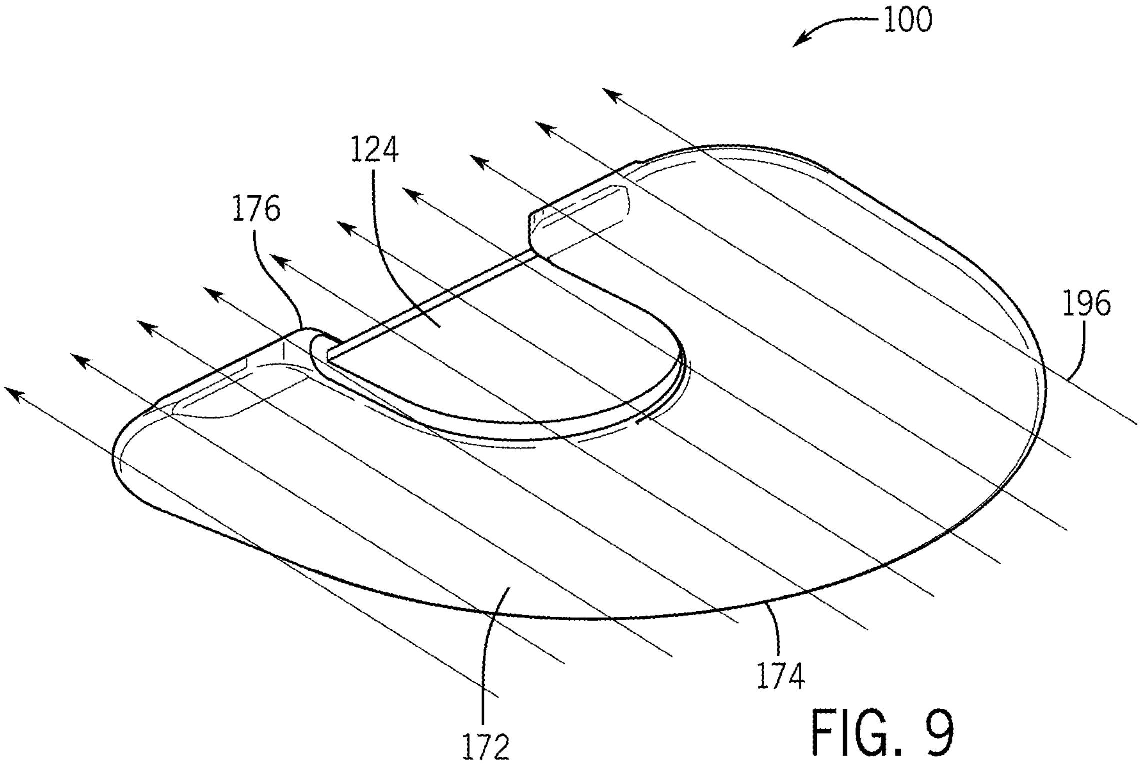
FIG. 9. is a rear perspective view showing the flow of air over the back surface of a holder that does not include a relief.

FIG. 9 illustrates a game call 100 in which the relief 178 is not present along the bottom surface 172. In this embodiment, the air flow 196 created by the user is shown by arrows. The air flow 196 passes over the bottom surface from the rear end 174 to the front end 176. Since the bottom surface 172 is generally planar, the air flow 196 moves smoothly along the bottom surface 172 and interacts with the diaphragm 124 causing the diaphragm 124 to vibrate to create a sound for the game call 100. In the embodiment shown in FIG. 9, the air flow 196 is generally laminar as illustrated by the straight line arrows. The laminar air flow 196 over the bottom surface 172 creates a consistent flow of air that will create a certain sound when it reaches the diaphragm 124. As described previously, different configurations of the diaphragm 124, as well as different positions of the entire game call 100 in the mouth of the user, allows the user to slightly modify the sound made by the game call 100. However, the differences in the sounds created by the user are limited based upon the configuration of the game call 100.

Figure 10:
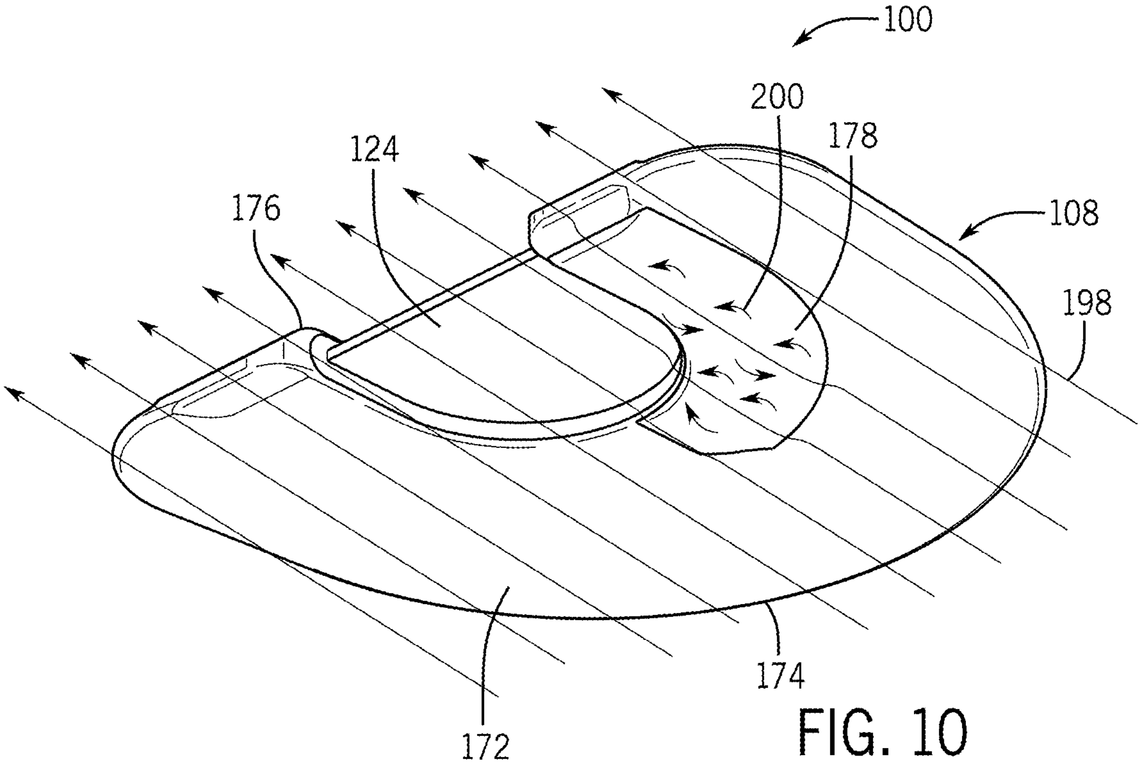
FIG. 10 is a rear perspective view showing the flow of air over the back surface of the holder including a relief.

FIG. 10 illustrates a game call 100 in accordance with the present disclosure that includes the relief 178 previously described. As indicated previously, the relief 178 protrudes away from the generally planar back surface 172. The relief 178 is positioned between the rear end 174 and the front end 176 such that the relief 178 interrupts the air flow 198 as the air flow passes along the otherwise generally planar bottom surface 172. The diaphragm 124 receives the air flow 198 from the user, which passes over the generally planar bottom surface 172.

As indicated in FIG. 10, the relief 178 protrudes away from the bottom surface 172 such that relief 178 interrupts the otherwise laminar flow of air. The interruption created by the protruding relief 178 creates areas of turbulent flow 200, as illustrated by the arrows. The area of turbulent flow 200 created by the relief 178 creates a different air flow over the diaphragm 124, thereby modifying the sound created by the game call 100. As described previously, the location, size and outer surface configuration of the relief 178 is a modification that can be made to the holder to create different types of turbulent air flow, thereby modifying the type of sound created by the game call 100. Thus, during the manufacturing process, different types of holders can be created, each having a different air flow profile. The configuration of the relief 178 and the diaphragm can be combined to create any number of sound profiles. In each case, the relief 178 will interrupt the otherwise laminar flow of air over the bottom surface 172 to modify the sound created by the game call 100. Since the relief 178 is formed integrally in a molded process with the rest of the holder 108, the orientation, size and thickness of the relief 178 can be modified and changed by simply modifying and changing the mold used to create the holder 108.

Figure 11:
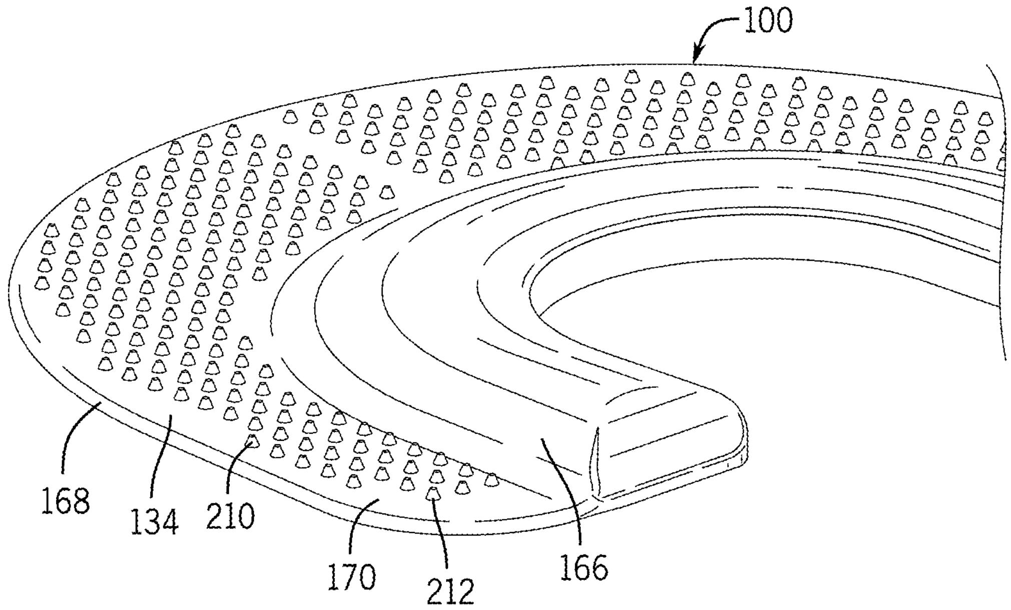
FIG. 11 is a perspective view of a first alternate embodiment including a first type of gripping elements on the flexible holder.

As indicated above, the game call 100 is designed to include a skirt 134 that engages the upper palette of a user during use of the game call 100. The user typically holds the game call 100 in place by creating a holding force by pressing the tongue against the bottom surface 172 and holding the game call 100 in place while creating an airflow over the bottom surface 172 and the diaphragm 124. FIG. 11 illustrates a first alternate embodiment of the game call 100 that includes a plurality of engagement members 210 that are spaced over the entire upper surface area of the skirt 134 from the outward facing surface 166 to the peripheral edge 168. The engagement members 210 are designed to create additional grip with the roof of the upper palette, which may be required upon a large volume of air being directed over the bottom surface, such as may be needed to increase the volume of the call or to create a desired call sound.

In the embodiment shown in FIG. 11, the plurality of engagement members 210 are pyramid-shaped cleats 212 that extend above the top surface 170 of the skirt 134. Each of the cleats 212 combine to create a roughened surface that enhances the gripping between the skirt and the roof of the user's mouth. The size of the cleats 212 are selected to provide a comfortable feel for the user while enhancing the grip with the roof of the mouth.

Figure 12:
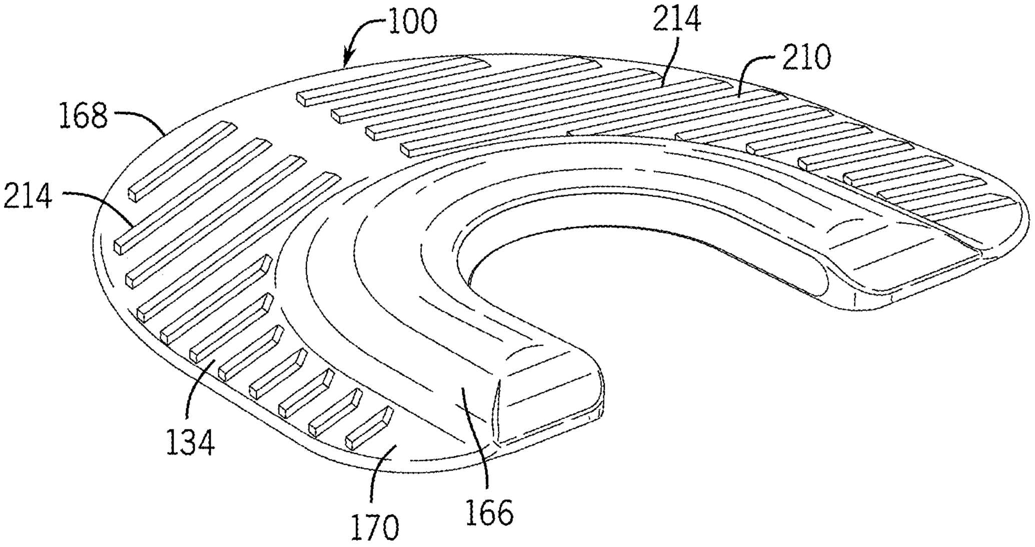
FIG. 12 is a perspective view of a second alternate embodiment including a second type of gripping elements on the flexible holder.

FIG. 12 illustrates a second alternate embodiment of the game call 100 that includes a second type of engagement member 210 on the skirt 134. The second embodiment of the engagement members 210 functions in the same way as the first embodiment of FIG. 11 and increases the grip between the skirt 134 and the roof of the mouth. In the second embodiment of FIG. 12, the engagement members 210 are a series of rails 214 that extend above the top surface 170 of the skirt 134. The rails 214 are spaced from each other and are generally parallel to each other along the top surface 170. The spacing between the rails 214 can be selected to create the desired gripping while also providing a comfortable feel for the user during use of the game call 100. The rails 214 will be formed from the same material as the rest of the holder 108 during the molding process for the holder 108. The number and spacing of the rails 214 can be varied depending upon design requirements.

Although two alternate types of engagement members 190 are shown in the embodiments of FIGS. 11 and 12, it is contemplated that other alternate embodiments could be deigned and used. The engagement members 210 are included to increase the gripping between the game call 100 and the roof of the mouth to prevent movement during use. Any shape or texture could be used while operating withing the scope of the present disclosure.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A one-piece holder for a game call, the game call including a reed insert with a diaphragm supported by a frame, the holder comprising:

a body portion molded from an elastomeric material configured to retain to a resting shape, the body portion including a top surface and an inward-facing surface that extends around a cutout positioned at a front side of the body portion;

a slot formed in the inward-facing surface, the slot being dimensioned to receive the frame of the reed insert so that the diaphragm spans across the cutout;

a skirt joined to the body portion and extending from the body portion in a direction away from the cutout;

a generally planar bottom surface of the holder, wherein the generally planar bottom surface includes a bottom surface of the body portion and a bottom surface of the skirt; and a relief formed along the bottom surface of the body portion and extending away from the bottom surface of the body portion of the holder to interrupt an air flow passing along the bottom surface of the holder.

2. The holder of claim 1, wherein the relief is integrally formed with the holder.

3. The holder of claim 1, wherein the relief has a thickness that is greater than a thickness of a bottom wall of the body portion.

4. The holder of claim 1, wherein the relief is positioned adjacent to at least a portion of the cutout.

5. The holder of claim 1, wherein the relief creates turbulent air flow along the bottom surface.

6. The holder of claim 1, wherein the elastomeric material is a plastisol or a rubber elastomer.

7. The holder of claim 1, wherein the holder includes a front end and a rear end, wherein air flows across the bottom surface of the holder from the rear end to the front end during use of the game call and the relief is positioned to interrupt the air flow cross the bottom surface of the holder.

8. The holder of claim 7, wherein the elastomeric material is suitable for inclusion in an oral cavity of a user.

9. A game call comprising:

a holder with a body portion molded from an elastomeric material configured to retain to a resting shape, the body portion including a top surface and an inward-facing surface that extends around a cutout positioned at a front side of the body portion;

a reed insert including a diaphragm stretched across a frame, the reed insert configured to extend across the cutout when the reed insert is received in the holder;

a slot formed in the inward-facing surface, the slot being dimensioned to receive the frame of the reed insert so that the diaphragm spans across the cutout;

a skirt joined to the body portion and extending from the body portion in a direction away from the cutout;

a generally planar bottom surface of the holder, wherein the generally planar bottom surface includes a bottom surface of the body portion and a bottom surface of the skirt; and a relief formed along the bottom surface of the body portion and extending away from the bottom surface of the body portion of the holder to interrupt an air flow passing along the bottom surface of the holder.

10. The game call of claim 9, wherein the relief is integrally formed with the holder.

11. The game call of claim 9, wherein the relief has a thickness that is greater than a thickness of a bottom wall of the body portion.

12. The game call of claim 9, wherein the relief is positioned adjacent to at least a portion of the cutout.

13. The game call of claim 9, wherein the holder includes a front end and a rear end, wherein air flows across the bottom surface of the holder from the rear end to the front end during use of the game call and the diaphragm is at the front end of the holder and the relief is positioned to interrupt the air flow before the air flow reaches the diaphragm.

14. The game call of claim 9, wherein the relief creates turbulent air flow along the bottom surface.

15. The game call of claim 9, wherein the elastomeric material is a plastisol or a rubber elastomer.

16. The game call of claim 15, wherein the elastomeric material is suitable for inclusion in an oral cavity of a user.

* * * * *